United States Patent
Shinzaki et al.

[11] Patent Number: 6,127,674
[45] Date of Patent: Oct. 3, 2000

[54] UNEVEN-SURFACE DATA DETECTION APPARATUS

[75] Inventors: Takashi Shinzaki; Ken Yokoyama; Yusaku Fujii; Kouji Honma, all of Kawasaki, Japan

[73] Assignee: Fujitsu Limited, Kawasaki, Japan

[21] Appl. No.: 09/044,972

[22] Filed: Mar. 20, 1998

[30] Foreign Application Priority Data

Sep. 1, 1997 [JP] Japan ................................. 9-235726

[51] Int. Cl.$^7$ ..................................... G01B 9/10
[52] U.S. Cl. ............................ 250/227.28; 250/227.31; 250/227.32; 356/71
[58] Field of Search ............................... 250/221, 227.2, 250/227.28, 227.31, 227.32, 227.11, 208.1; 382/124, 125, 127, 126; 385/33, 36, 146; 359/663, 710, 726, 728, 729, 730, 731

[56] References Cited

U.S. PATENT DOCUMENTS

| | | | |
|---|---|---|---|
| 4,924,085 | 5/1990 | Kato et al. | 250/227.28 |
| 5,596,454 | 1/1997 | Hebert | 250/227.11 |
| 5,619,586 | 4/1997 | Sibbald . | |
| 5,900,993 | 5/1999 | Betensky | 359/710 |

FOREIGN PATENT DOCUMENTS

| | | |
|---|---|---|
| 0 194 783 B1 | 4/1993 | European Pat. Off. . |
| 62-187819 | 8/1987 | Japan . |
| 2-176984 | 7/1990 | Japan . |

OTHER PUBLICATIONS

Igaki et al., Real–time fingerprint sensor using a hologram, Applied Optics, vol. 31 No. 11, pp. 1794–1802, Apr. 10, 1992.

*Primary Examiner*—John R. Lee
*Attorney, Agent, or Firm*—Staas & Halsey LLP

[57] ABSTRACT

There is provided an uneven-surface data input apparatus capable of obtaining a fingerprint image which is seldom distorted, in which it is unnecessary to conduct image processing when the fingerprint image is inputted. The uneven-surface data detection apparatus comprises: a light source 10; a transparent base 11 in which light sent from the light source can be transmitted, having an uneven pattern input surface 11a with which an uneven-surface 12a, 12b to be detected comes into contact, also having a function in which light reflected on a projecting surface coming into contact with the input surface and light reflected on a recess surface are separated from each other when the uneven-surface is irradiated with light on the input surface; an optical path length compensating prism 17 on which light emergent from the transparent base is incident so as to compensate for a difference in the optical path length; an optical system 13, 14, 15 for forming an image by light emergent from the optical path length compensating prism, the optical system being arranged on the optical axis at the rear of the optical path length compensating prism; and an image sensor 16 arranged at an image forming position so that optical data of the uneven-surface focused by the optical system can be recorded.

11 Claims, 17 Drawing Sheets

INPUT PATTERN

IMAGE

OBJECT

LENS

IMAGE ELEMENT

OBJECT SURFACE

LENS

IMAGE SURFACE a < b
c < d

Fig.5
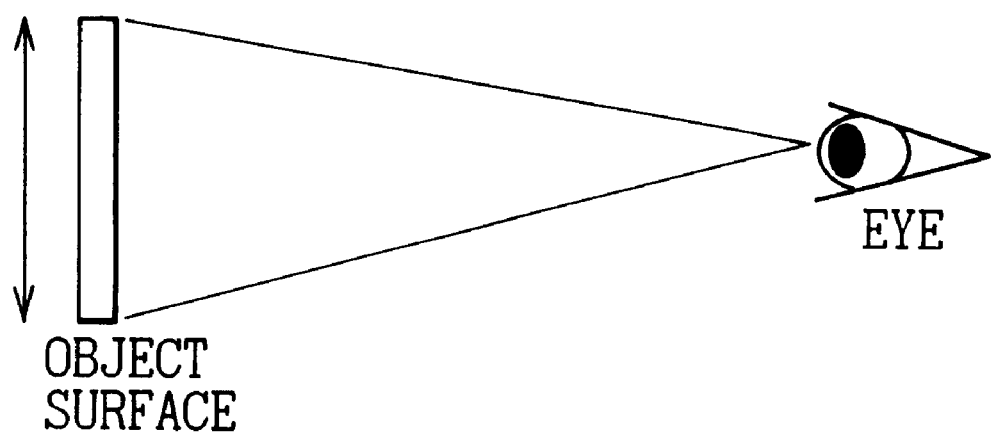
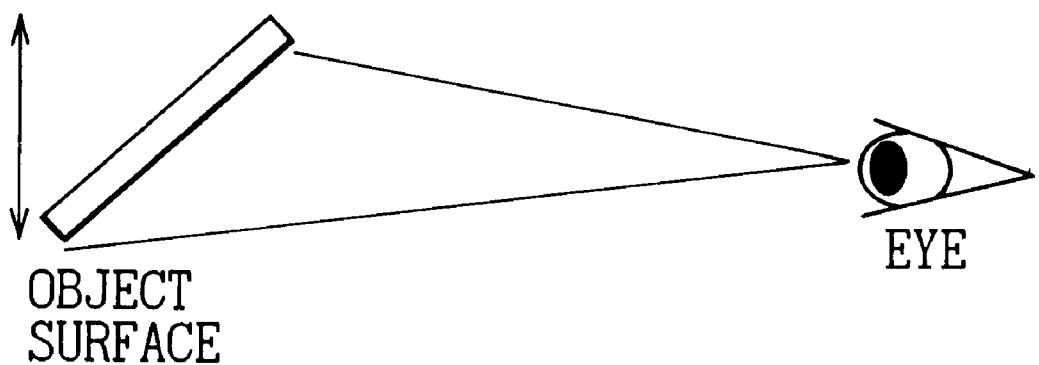

INPUT PATTERN  IMAGE

UNEVEN-SURFACE DATA DETECTION APPARATUS

BACKGROUND OF THE INVENTION

1. Field of the Invention

The present invention relates to an unevensurface data detection apparatus used for registering uneven-surface data such as a human fingerprint and collating a human fingerprint with uneven-surface data which has already been registered.

2. Description of the Related Art

In the field of a criminal investigation, there is provided a collation system in which a human fingerprint or palm-print is collated with data so that a suspect can be identified. In this collation system, a human fingerprint or palm-print is usually processed as an image. Therefore, it is necessary to provide an input device by which a human fingerprint or palm-print is converted into image data. As an electrical means for directly picking up a human fingerprint, there is a method shown in FIG. 19. When a finger 10 is pressed against one surface 31a of the transparent parallel plate 31, which is a light guiding plate, a projecting portion 10a of the finger 10 comes into contact with the plane 31a, however, a recess portion 10b does not come into contact with the plane 31a. When light sent from LED 33 is irradiated on the plane 31a, against which the finger is pressed, via the transparent base 31, it is reflected on the surface of the finger and scattered inside the finger.

Scattered light sent from the recess portion 10b of the finger 10 passes through an air layer and is incident on the transparent base 31. Accordingly, there is no component of light which is totally reflected and propagated in the transparent base 31. However, light reflected and scattered by the projecting portion 10a is directly incident on the transparent base 31 as a spherical wave, and a portion of the light satisfies the total reflecting condition in which light is totally reflected in the transparent base 31, and light propagates in the transparent base 31 while the total reflection is repeated. When this total reflection component is focused on CCD 37 by an appropriate optical system including a mirror 32, diaphragm 34, lense 35 and mirror 36, it is possible to obtain an image of the ridge pattern of the projecting portion 10a in real time.

However, the following problems may be encountered in the above optical system. A fingerprint image outputted from the above optical system is distorted trapezoidally as shown in FIG. 2, that is, the magnification of x and Y-directions are different from each other. There are two reasons which will be described as follows. One reason is a difference in the image forming magnification caused by a difference in the length of the optical path between the input surface and the image forming system, which originates from the input surface, which is oblique to the optical axis as shown in FIG. 4. The other reason is a difference in the magnifications of X and Y-directions of the formed fingerprint image which is caused by the oblique input surface shown in FIG. 5.

In order to solve the above problems, Japanese Unexamined Patent Publication No. 62-187819 discloses a method in which light emitted from the transparent flat plate is guided by hologram. However, the above technique has the following disadvantages. When a hologram is used, the angle of diffraction is sensitive to the wavelength of the light source. Therefore, it is necessary to use a light source such as a laser, the wavelength region of which is small, therefore the resolution of the image is deteriorated due to astigmatism. Another method is disclosed in Japanese Unexamined Patent Publication No. 2-176984, in which an optical path length compensating prism is provided for compensating for the optical path length on the transparent flat plate. However, the above method is disadvantageous in that the magnification of X and Y-directions can not be sufficiently compensated for by only the compensating prism in the image formation. For the above reasons, there is caused a problem that a square image is detected as a rectangular image as shown in FIG. 20. In this case, it is necessary to convert the resolution of X and Y-directions when the image is processed. In the case of picking up a finger print used as a piece of evidence for the purpose of a criminal investigation, it is preferable that image processing is not conducted. Accordingly, it is preferable to provide a fingerprint image pickup apparatus in which all image compensation can be conducted in the optical system.

SUMMARY OF THE INVENTION

It is an object of the present invention to provide an uneven-surface data input apparatus capable of obtaining a fingerprint image which is seldom distorted, and when a fingerprint image is inputted into this unevensurface data input apparatus, it is unnecessary to process the fingerprint image.

In order to accomplish the above object, the present invention provides an uneven-surface data detection apparatus comprising: a light source; a transparent base, in which light from the light source can be transmitted, having an uneven pattern input surface with which an uneven-surface to be detected comes into contact and also having a function in which light reflected on a projection and coming into contact with the input surface and light reflected on a recess are separated from each other utilizing a critical angle on the interface with air when the uneven-surface is irradiated with light on the input surface; an optical path length compensating prism on which light emerging from the transparent base is incident so as to compensate for a difference in the optical path length; an optical system for forming an image by light emerging from the optical path length compensating prism, the optical system being arranged on the optical axis at the rear of the optical path length compensating prism, having a diaphragm and one set of cylindrical lenses which are arranged perpendicularly to each other in the X and Y-directions for compensating the X and Y-magnification; and an image sensor arranged at an image forming position so that optical data of the uneven-surface focused by the optical system can be recorded. A difference in the optical path length in the transparent base having the uneven pattern input surface is compensated for by the compensating prism. Accordingly, a trapezoidal distortion caused on an image having an uneven surface such as a fingerprint can be compensated for.

The diaphragm is arranged on the optical axis at the rear of the optical path length compensating prism, and one set of cylindrical lenses, which are arranged perpendicularly to each other in the X and Y-directions, are arranged at the rear of the diaphragm. Due to the foregoing, the aspect ratio of the image can be compensated for.

The diaphragm is arranged on the optical axis at the rear of the optical path length compensating prism, and one set of cylindrical lenses arranged at the rear of the diaphragm are composed of an incident surface side lens section which contributes to the image formation in the X-direction and an emergent side lens section which contributes to the image formation in the Y-direction, and these incident surface side lens section and emergent side lens section are arranged perpendicularly to each other in the X and Y-directions so as to compensate for the X and Y-magnification. Due to the foregoing, the aspect ratio of the image can be compensated for by the integrated cylindrical lenses.

The optical system includes a meniscus lens arranged on the optical axis at the rear of the optical path length compensating prism and in the front of the diaphragm. Due to the foregoing, it becomes possible to enhance the resolution of an image.

The optical system includes: a first cylindrical lens arranged on the optical axis at the rear of the optical path length compensating prism, the first cylindrical lens compensating for the X-magnification; a meniscus lens arranged on the optical axis at the rear of the first cylindrical lens; a diaphragm arranged on the optical axis at the rear of the meniscus lens; and a second cylindrical lens arranged on the optical axis at the rear of the diaphragm, the second cylindrical lens compensating for the Y-magnification. Due to the foregoing, it becomes possible to select various optical systems. Therefore, the aspect ratio of the image can be compensated for, so that an image of high resolution can be obtained.

The transparent base is a parallel flat plate, and light sent from the light source incident on the parallel flat plate is irradiated onto the uneven pattern input surface which is defined by one parallel surface of the parallel flat plate. The transparent base is a prism having an uneven pattern input surface and light sent from the light source incident on the prism irradiates the uneven pattern input surface.

The transparent base and the optical path length compensating prism are integrated with each other into one body. Alternatively, the transparent base and the optical path length compensating prism are arranged so that they come into surface contact with each other. Alternatively, the transparent base and the optical path length compensating prism are arranged so that they are separate from each other.

The refractive index of the optical path length compensating prism is higher than that of the transparent base. The refractive index of the cylindrical lens is higher than that of the meniscus lens.

BRIEF DESCRIPTION OF THE DRAWINGS

FIG. 5 is a view showing a change in the aspect ratio caused by an oblique input surface;

DETAILED DESCRIPTION OF THE EMBODIMENTS

FIRST EMBODIMENT

Figure 1:
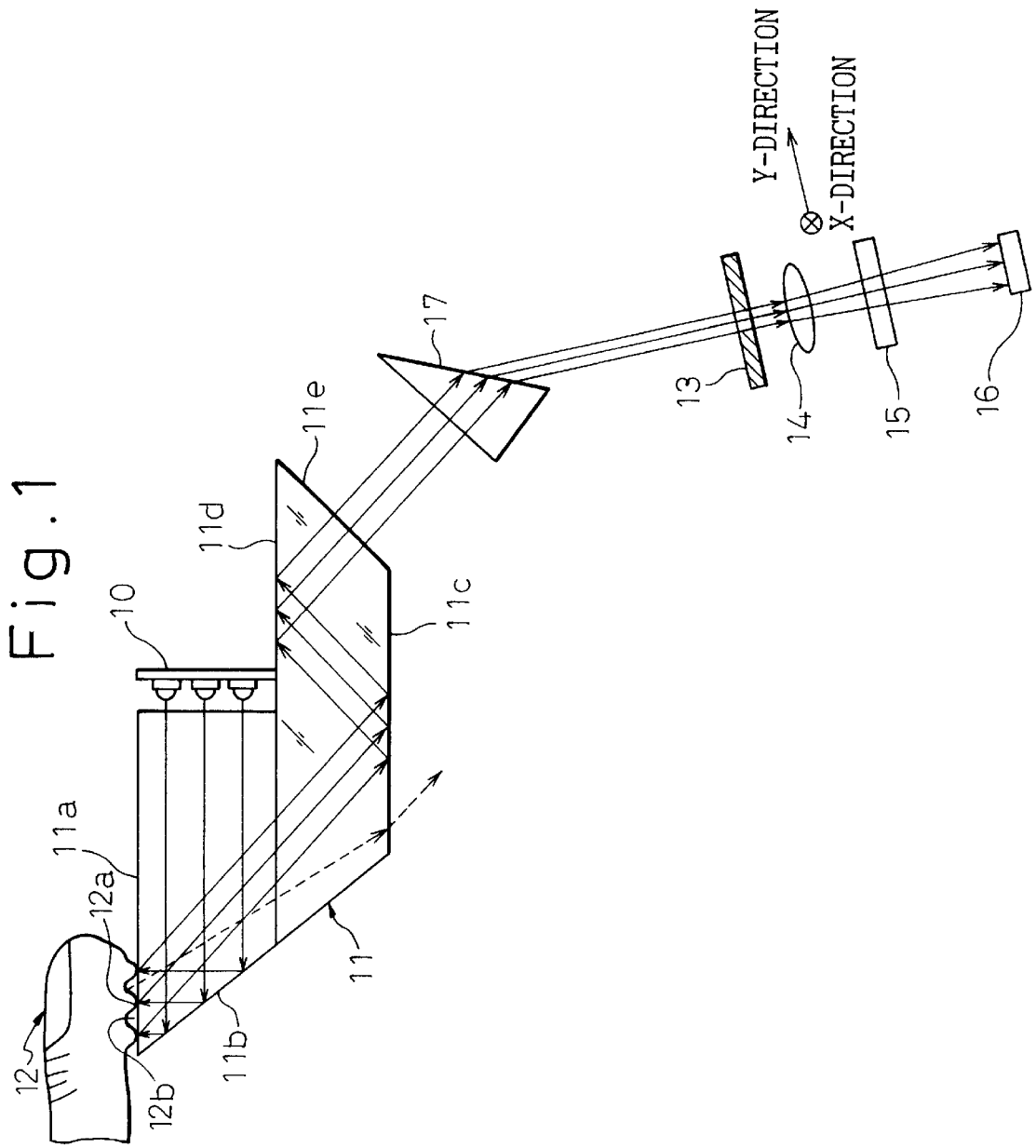
FIG. 1 is a view showing the first embodiment of the uneven-surface data detection apparatus of the present invention.

FIG. 1 is a view showing the first embodiment of the uneven-surface data detection apparatus of the present invention. The illuminating light source 10 is composed of a light source such as an LED. Light emitted from the illuminating light source 10 can be transmitted in the transparent base 11 which is made of a parallel flat plate of transparent glass. On one parallel surface of the transparent body 11, there is formed an uneven pattern input surface 11a on which the finger 12 having an uneven surface is put so that the fingerprint surface can be contacted with the input surface 11a. This transparent base 11 includes: an oblique surface 11b which is oblique to the input surface 11a; a bottom surface 11c which is parallel to the input surface 11a; an upper surface 11d which is parallel to this bottom surface 11c and arranged on the opposite side to the bottom surface 11c; and an end surface 11e which is oblique to this upper surface 11d.

Light is emitted from the illuminating light source 10 and enters the transparent body 11. Then, parallel light is totally reflected on the oblique surface 11b in the transparent body 11. Next, parallel light advances in a direction perpendicular to the input surface 11a, so that the uneven fingerprint surface of the finger 12 can be irradiated with parallel light. Due to the foregoing, light reflected on the projecting surface coming into contact with the input surface 11a is separated from light reflected on the recess surface.

The detail will be described as follows. When the finger 12 is pressed against the pattern input surface 11a which is one surface of the transparent base 11, the projecting portion 12a of the fingerprint comes into contact with this input surface 11a, however, the recess portion of the fingerprint does not come into contact with this input surface 11a. When the plane (input surface 11a) against which the finger 12 is pressed is irradiated with light sent from the light source 10 through the transparent base 11, light is reflected on the finger surface and scattered inside the finger. Light, which has been scattered in the recess portion 12b on the fingerprint of the finger 12, passes through a layer of air and is incident on the transparent base 11 again. Accordingly, there is no component of light which is totally reflected in the transparent base 11 and propagated.

On the other hand, light, which has been reflected and scattered by the projecting portion 12a on the fingerprint of the finger 12, is directly incident on the transparent base 11 as a spherical wave, and a portion of light satisfies the condition of total reflection in the transparent base 11 and is totally reflected in the transparent body 11 and propagated. When image formation of this totally reflecting component is conducted through an appropriate optical system, it is possible to obtain a ridge pattern of the projecting portion 12a in real time.

Figure 2:
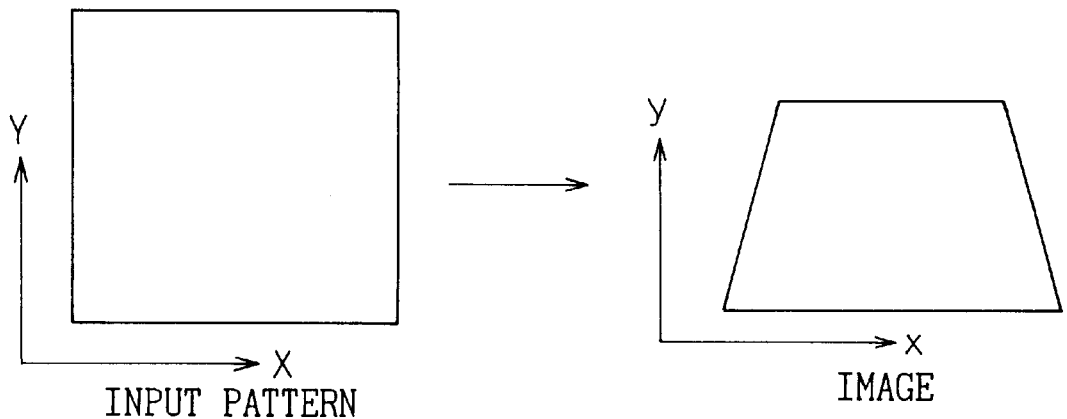
FIG. 2 is a view showing a trapezoidal distortion of an image.
Figure 3:
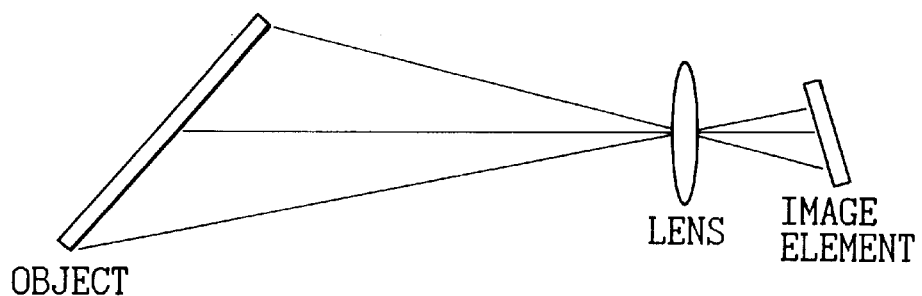
FIG. 3 is a development view of the conventional optical system known in the prior art.

However, when image formation is conducted by a common optical system having a diaphragm and a simple convex lens, the obtained fingerprint image is distorted as shown in FIG. 2, that is, a trapezoidal distortion is caused and, further, the aspect ratio is changed.

Figure 4:
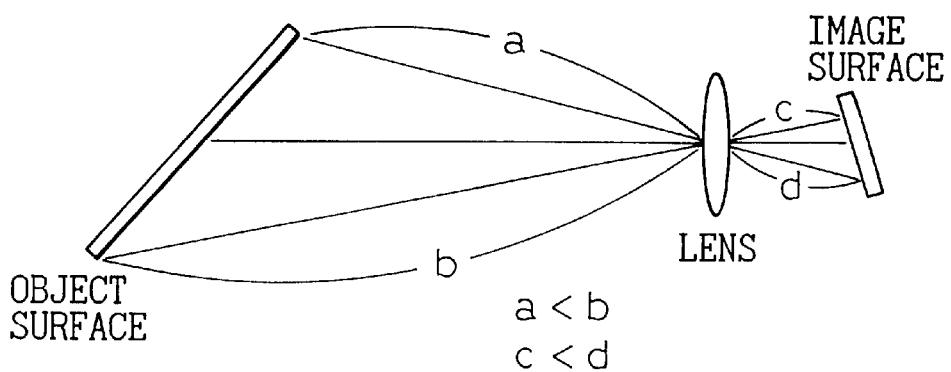
FIG. 4 is a view showing a difference in the magnification of image formation caused by a difference in the length of the optical path.

The reason why the image is trapezoidally distorted and the aspect ratio is changed is that an input surface onto which light is inputted from a photographic object is oblique to the optical axis. When the input surface is oblique to the optical axis, a difference in the magnification of image formation is caused by a difference in the length of the optical path between each portion on the input surface and the image forming optical system as shown in FIG. 4. For example, when there is caused a difference in the length of the optical path from the object surface to the optical system in such a manner that a<b, a difference in the length of the optical path from the optical system to the image formation surface is caused in such a manner that c<d. A difference in the aspect ratio is caused by the oblique of the input surface as shown in FIG. 5.

In order to solve the above problems, the optical system of image formation of the present invention includes a prism 17 for compensating for the optical path length and a lens system composed of lenses 14 and 15. That is, there is provided an optical path length compensating prism 17 between the transparent base 11 and the diaphragm 13, so that light emergent from the transparent base 11 can be incident on this compensating prism 17. After light has passed through in the optical path compensating prism 17, it passes through the diaphragm 13. Then, light passes through the cylindrical lens 14 for converging light in the Y-direction, and then it passes through the cylindrical lens 15 for converging light in the X-direction which is arranged in a direction perpendicular to the Y-direction. In this way, an image is formed on the image sensor 16.

When light reflected from the ridge (projecting portion) of the fingerprint passes through the compensating prism 17 for compensating for the optical path length, reflected light is refracted at the interface between the prism 17 and air when it emerges from the prism 17. By this refraction, a difference is caused between the optical path length of light which is emergent from the compensating prism 17 as shown in FIG. 6 so that the optical axis can be bent so as to compensate for a difference ($\alpha$) in the optical path length on the reflecting surface 11a, that is, so that a difference in the length of the optical path from the reflecting surface 11a to the image surface 16 can be reduced.

Apparently, when the compensating prism 17 is interposed between the transparent base 11 and the diaphragm 13, the difference in the optical path length is increased. However, since the optical path length in glass of the compensating prism 17 is 1/n of the optical path length in air, (n is a refractive index of glass (n>1)) the difference in the optical path length can actually be decreased.

Figure 6:
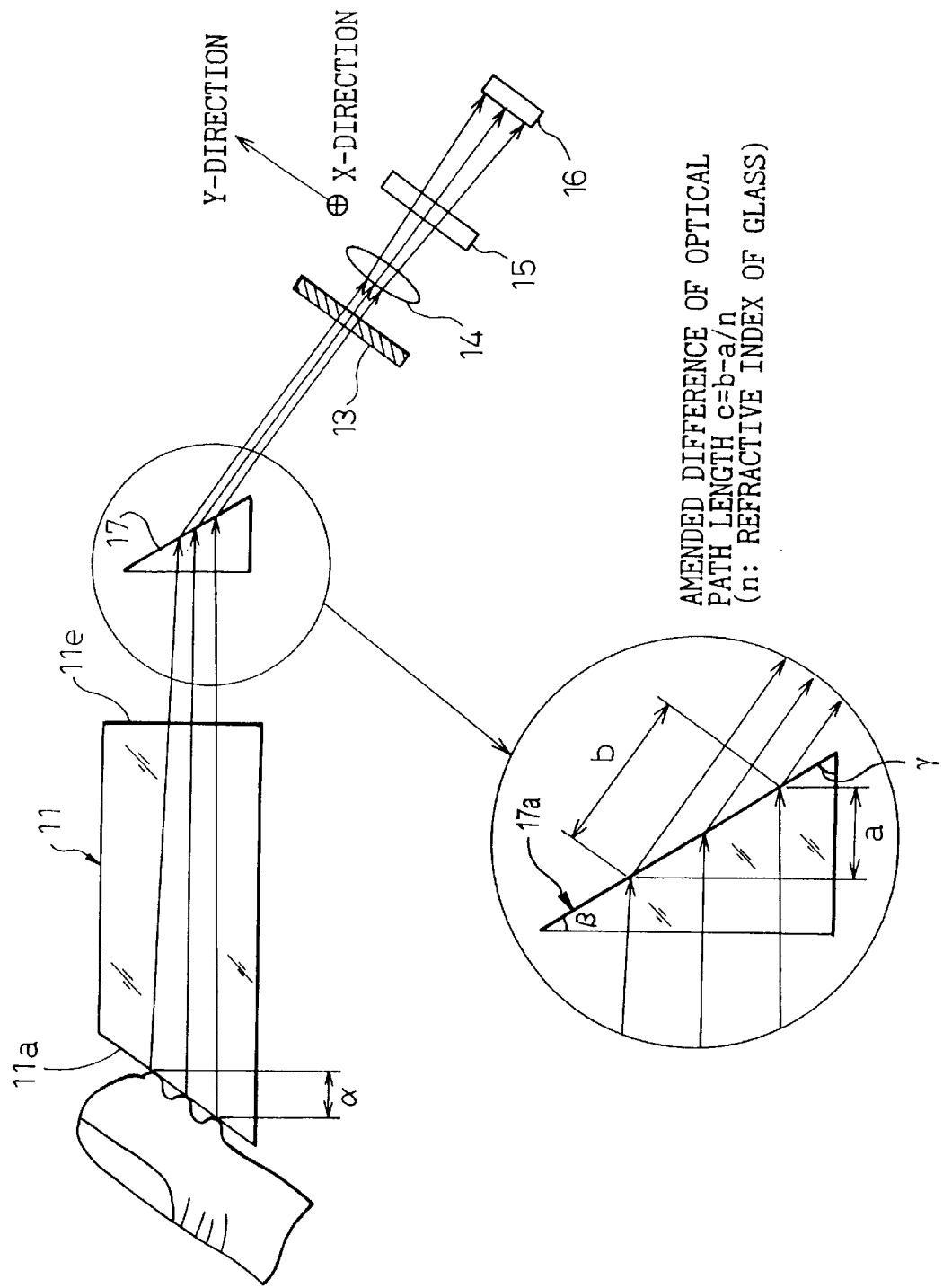
FIG. 6 is a view showing a state of image formation in the optical system of the present invention.

In FIG. 6, a difference c of the optical path length compensated for by the compensating prism 17 is expressed as follows. As illustrated in the drawing, "a" is a difference of the optical path length of light incident from the inside of the compensating prism 17 on the refractive surface 17a, "b" is a difference of the optical path length of light emergent from the refractive surface 17a of the compensating prism 17 into air, and "n" is a refractive index of glass of the compensating prism 17. With respect to the difference "b" in the optical path length in air, the difference in the optical path length in glass of the compensating prism 17 is a/n. Accordingly, the difference "c" in the optical path length entirely compensated for by the compensating prism 17 is expressed as follows.

$$c = b - a/n \qquad (1)$$

In the case where the refractive index of the transparent base 11 coincides with the refractive index of glass of the compensating prism 17, the difference in the optical path length can be made up when the equation of $\alpha/n = c$ is satisfied, wherein $\alpha$ represents an optical path length difference on the reflecting surface 11a of the transparent base 11, and c represents an optical path length difference compensated for by the compensating prism 17.

Figure 7:
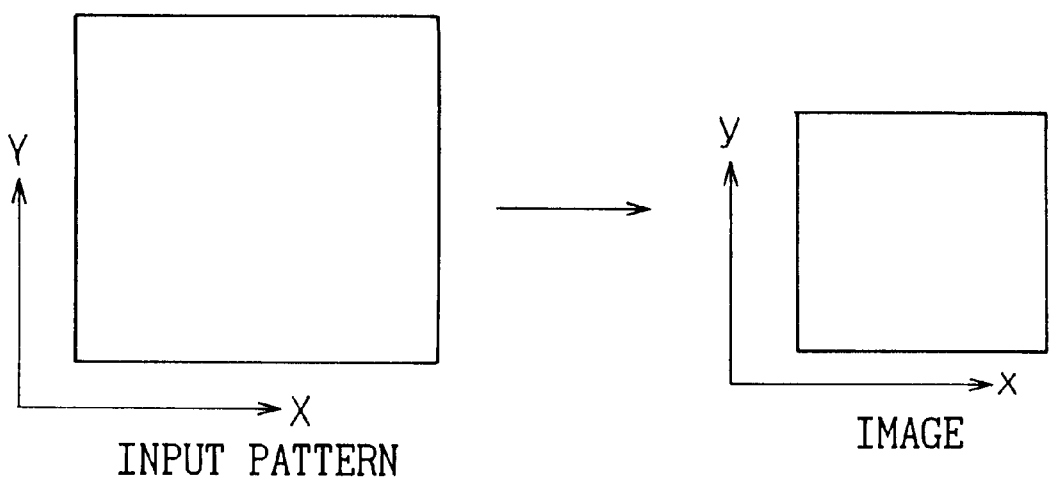
FIG. 7 is a view showing a state of compensation of difference in the length of the optical path conducted by a compensating prism.

After the difference in the optical path length has been made up, light emerges from the compensating prism 17 and passes through the diaphragm 13. Then, light passes through a pair of cylindrical lenses 14 and 15 which are arranged perpendicular to each other, so that the magnifications in the X and Y-directions can be compensated for. Then, light is formed into an image on the image sensor 16. The cylindrical lenses 14, 15 are arranged so that the front stage cylindrical lens 14 can converge light in the direction of Y, and the rear stage cylindrical lens 15 can converge light in the direction of X. In other word, in FIG. 6, the respective cylindrical lenses 14, 15, which are arranged perpendicular to each other with respect to the optical axis, can be independently adjusted in the direction of the optical axis. Accordingly, the image magnification in the direction of Y, which is parallel to the sheet surface of FIG. 6, and the image magnification in the direction of X, which is perpendicular to the sheet surface of FIG. 6, can be independently compensated for. Therefore, adjustment work can be easily conducted and, further, the adjustment accuracy can be kept high. As a result, it is possible to obtain an image illustrated in FIG. 7.

In the first embodiment shown in FIG. 1, illumination light emitted from the light source 10 is incident on the transparent base 11 and is once reflected on the oblique surface 11b. After that, light is incident on the input surface 11a. However, light may be directly incident on the input surface 11a from the bottom surface 11c of the parallel flat plate 11 which is a transparent base.

SECOND EMBODIMENT

Figure 8:
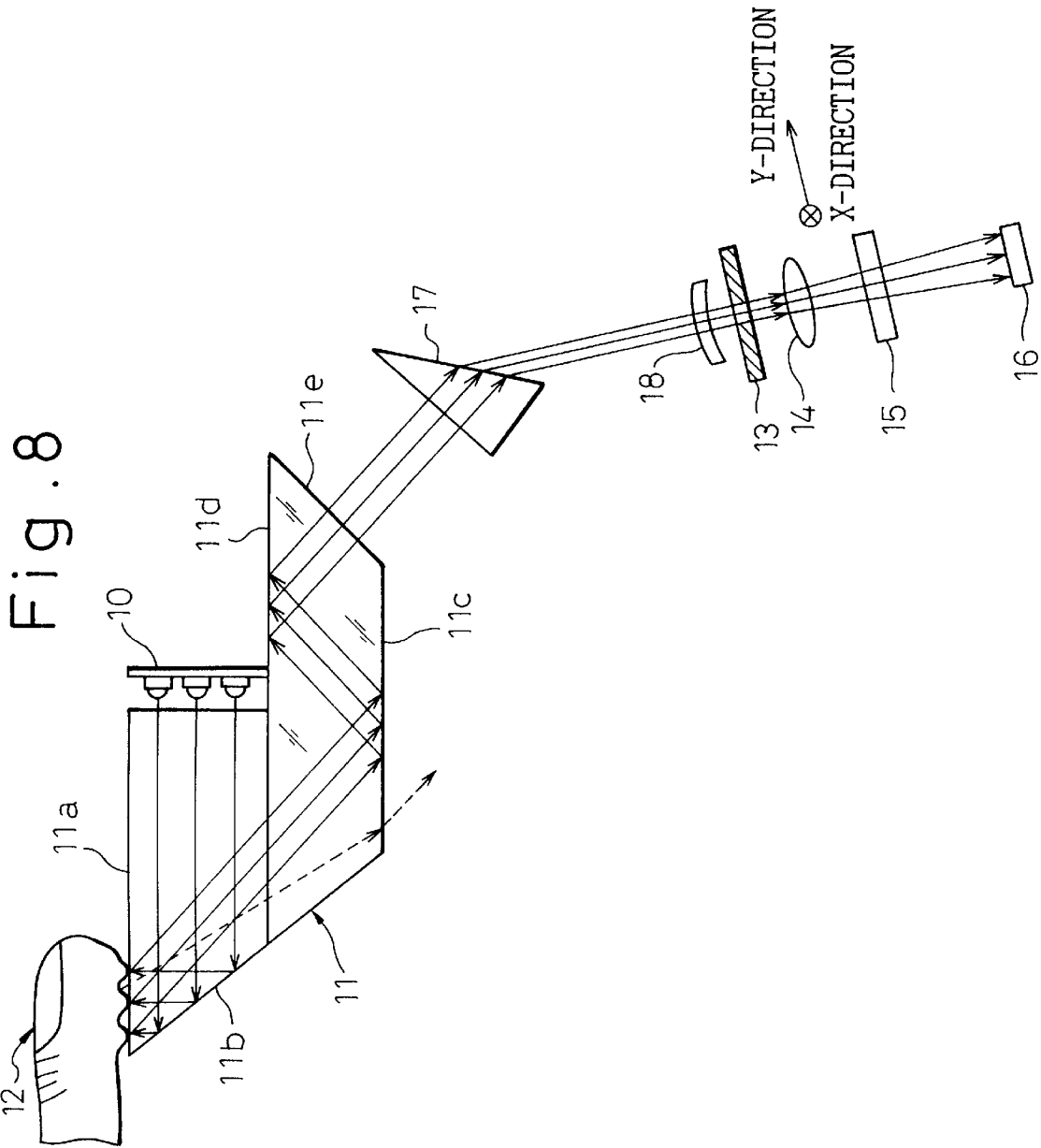
FIG. 8 is a view showing the second embodiment of the uneven-surface data detection apparatus of the present invention.

FIG. 8 is a view showing the second embodiment of the present invention. In order to obtain a resolving power (MTF) of the optical system higher than that of the first embodiment, a meniscus lens 18 is arranged in the front of the diaphragm 13. Other points of structure and function are the same as those of the first embodiment.

As shown in the drawing, this meniscus lens 18 is circular, and one surface of the meniscus lens 18 is convex, and the other surface is concave. This meniscus lens 18 has the functions of compensating for astigmatism and enhancing the resolving power. Since the pair of cylindrical lenses 14 and 15, which are arranged at the rear of the diaphragm 13, independently converge light in the directions of Y and X, this meniscus lens effectively functions to compensate for a focus deviation caused between the focuses of the two cylindrical lenses 14 and 15.

THIRD EMBODIMENT

Figure 9:
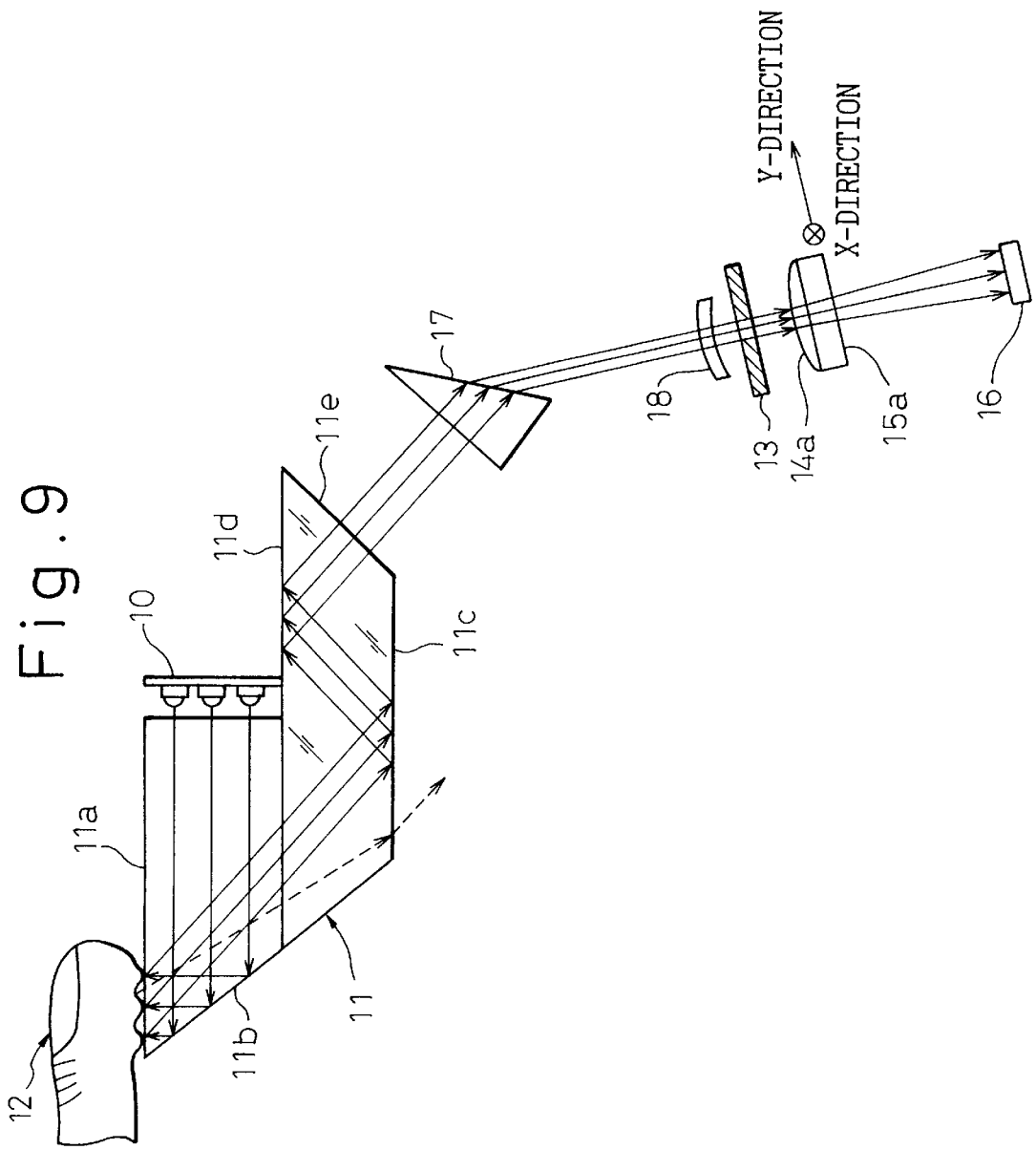
FIG. 9 is a view showing the third embodiment of the uneven-surface data detection apparatus of the present invention.

FIG. 9 is a view showing the third embodiment of the present invention. In the second embodiment shown in FIG. 8, the two cylindrical lenses 14 and 15 are combined with each other to compensate for the magnification. On the other hand, in the third embodiment, in order to reduce reflection at the interface, the cylindrical lens in the X-direction and the cylindrical lens in the Y-direction are integrated into one body back to back with each other. Accordingly, this integrated lens is adjusted in the direction of the optical axis or the direction perpendicular to the optical axis.

FOURTH EMBODIMENT

Figure 10:
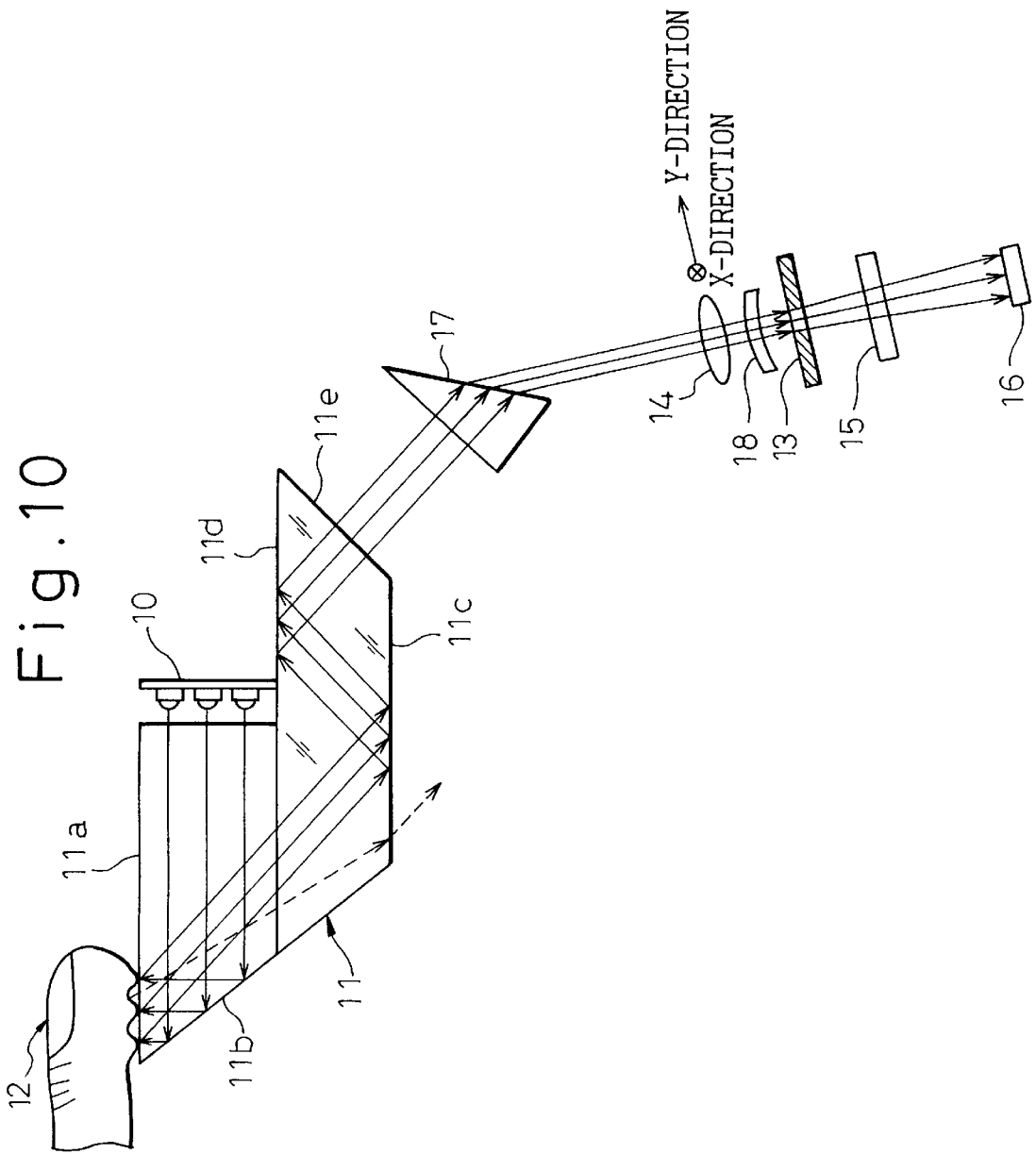
FIG. 10 is a view showing the fourth embodiment of the uneven-surface data detection apparatus of the present invention.

FIG. 10 is a view showing the fourth embodiment of the present invention. In order to obtain a higher resolving power (MTF) of the optical system, the optical system to form an image includes: a compensating prism 17, a cylindrical lens 14 for converging light in the direction of Y (Y-direction), a meniscus lens 18, a diaphragm 13, and a cylindrical lens 15 for converging light in the direction of X (X-direction). In this optical system, the meniscus lens 18 has a function of suppressing the astigmatism of the cylindrical lens system composed of the lenses 14 and 15. Due to the foregoing, it is possible to design and manufacture a bright optical system of high resolution.

In this fourth embodiment, the cylindrical lenses 14 and 15 used for converging light in the directions of Y and X are arranged separate from each other. Therefore, even in the case where the radius of curvature of a lens is relatively large and astigmatism tends to occur, the occurrence of astigmatism can be suppressed.

FIFTH EMBODIMENT

Figure 11:
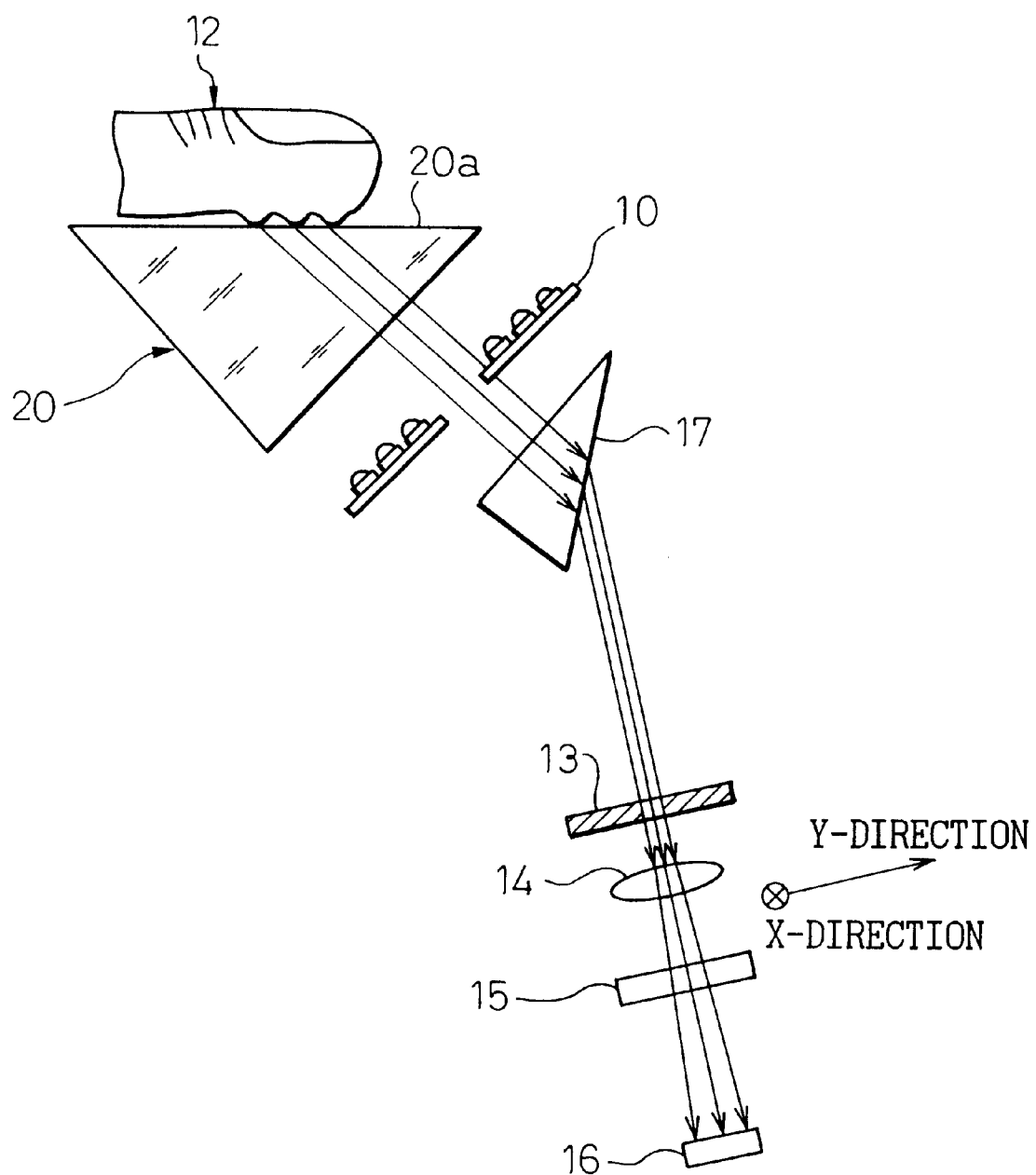
FIG. 11 is a view showing the fifth embodiment of the uneven-surface data detection apparatus of the present invention.

FIG. 11 is a view showing the fifth embodiment of the present invention. In this embodiment, a prism 20 is used instead of the transparent flat plate 11. One plane of the prism 20 functions as an input surface 20a on which the finger 12 is put. Light emitted from the illuminating light source 10 is scattered on the input surface 20a, and a total reflecting component of the thus scattered light is incident on the optical path length compensating prism 17. Accordingly, even when this prism 20 is used instead of the transparent flat plate 11, separation between the projecting surface and the recess surface of the uneven fingerprint surface of the finger 12 can be accomplished by the same principle as that of the first embodiment.

In this connection, as shown in the drawing, the illuminating light source 10 is arranged on the same side as that of the optical path length compensating prism 17, with respect to the input surface 20a, however, for example, a lower portion of the prism 20 shown in the drawing may be cut off and light may be irradiated from the lower side of the prism 20 to the input surface 20a on the upper side.

SIXTH EMBODIMENT

Figure 12:
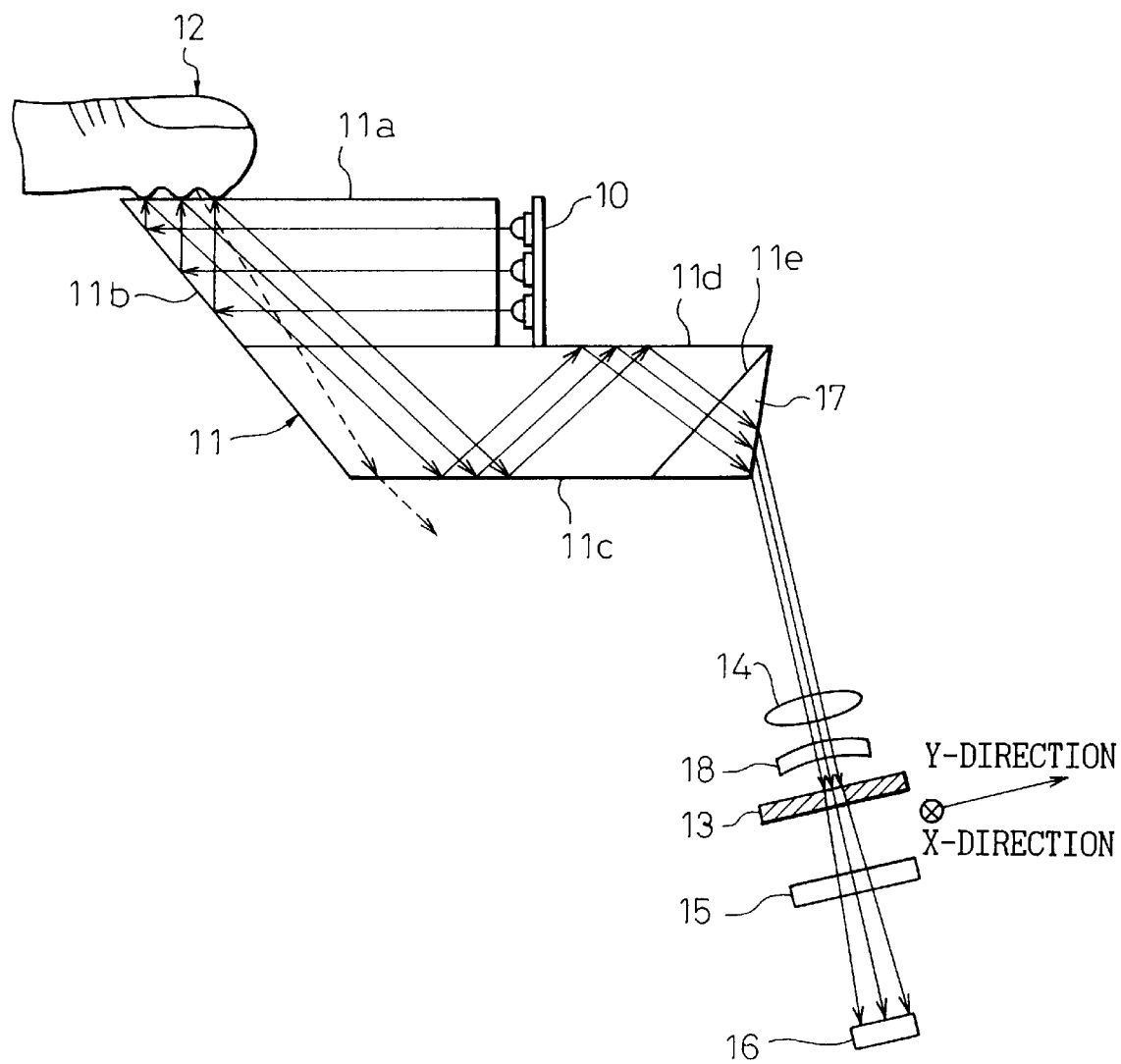
FIG. 12 is a view showing the sixth embodiment of the uneven-surface data detection apparatus of the present invention.

FIG. 12 is a view showing an embodiment in which the transparent base 11 composed of a parallel flat plate and the compensating prism 17 are integrated into one body in the first embodiment shown in FIG. 1. In this embodiment, the optical path compensating prism 17 is made to adhere onto an end surface 11e of the transparent base 11 from which the reflecting light of the projecting portion of the fingerprint emerges. Due to the foregoing arrangement, it becomes easy to position the transparent base 11 and the compensating prism 17. Accordingly, the optical system can be easily mounted in the apparatus.

Figure 13:
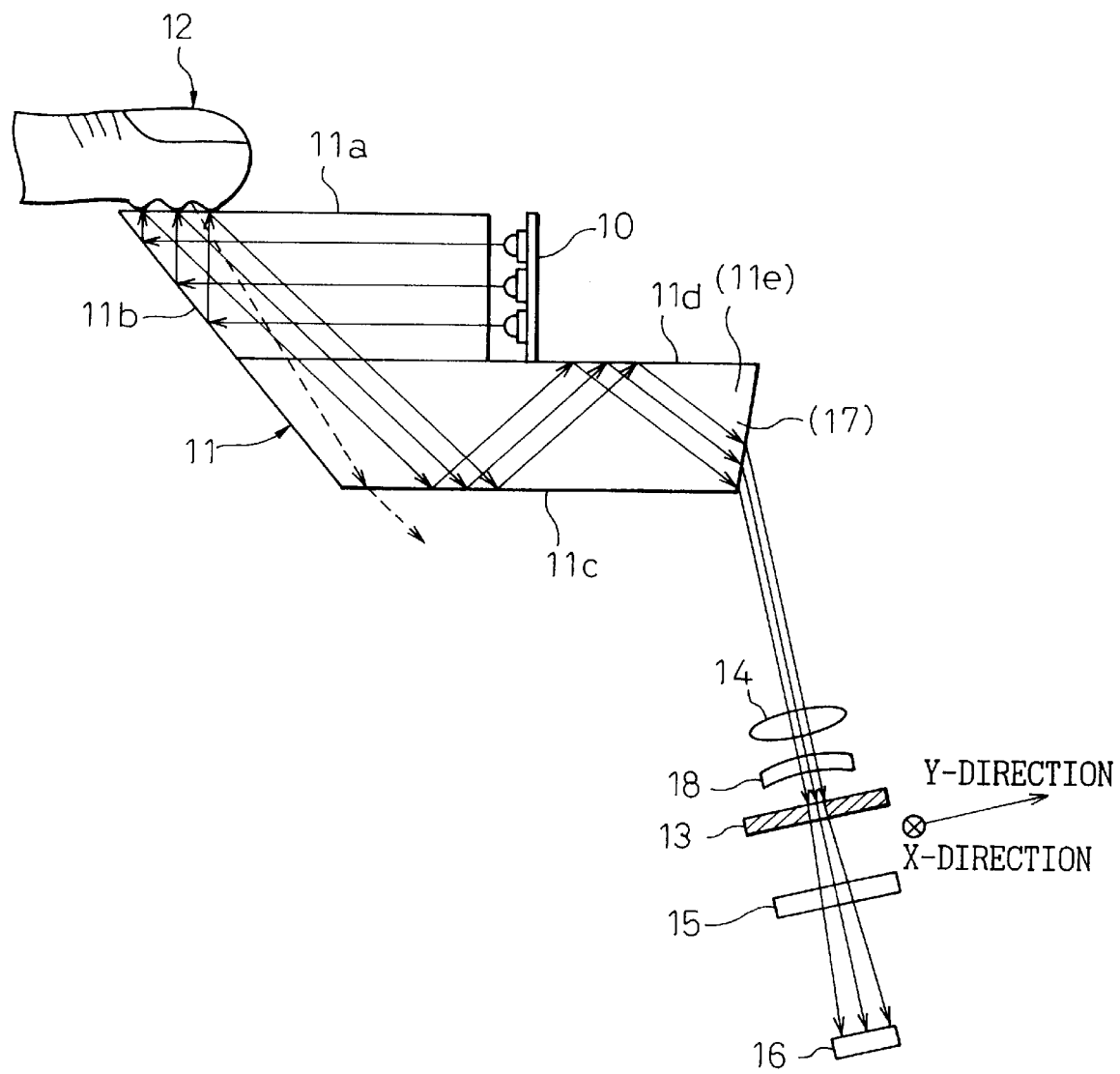
FIG. 13 is a view showing a variation in which an angle between the end surface and the optical axis is changed in the sixth embodiment.

Even if the transparent base 11 and the compensating prism 17 are not integrated into one body, which is different from the arrangement shown in FIG. 12, the same effect as that of the arrangement, in which the transparent base 11 and the compensating prism 17 are integrated into one body, can be provided when an angle of the end surface 11e, from which reflecting light is introduced from the projecting fingerprint portion in the transparent base 11, is not perpendicular to the optical axis but some angle is provided on the end surface lie as shown in FIG. 13. Other point of structure and function are the same as those of the fourth embodiment.

SEVENTH EMBODIMENT

Figure 14:
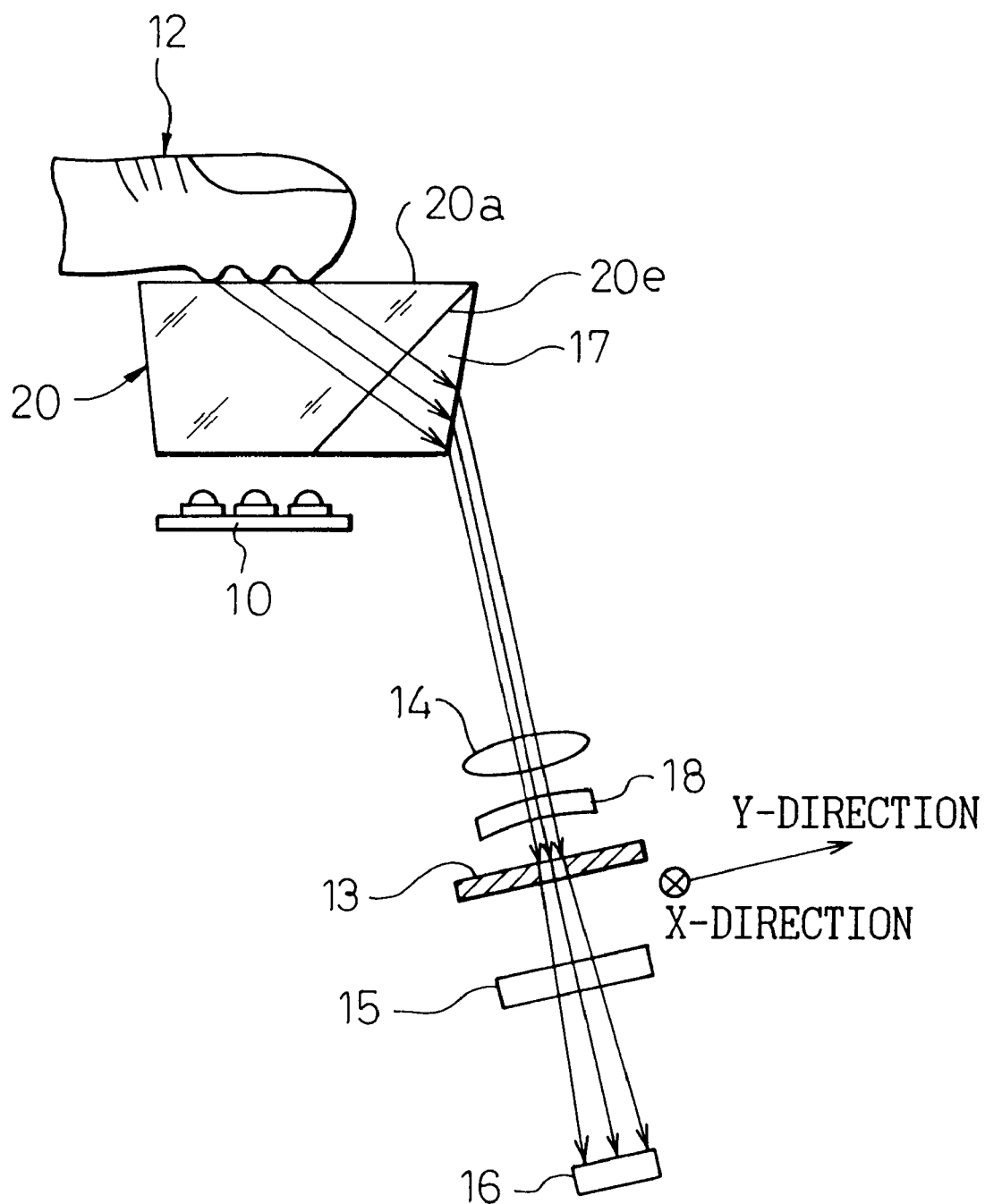
FIG. 14 is a view showing the seventh embodiment of the uneven-surface data detection apparatus of the present invention.

FIG. 14 is a view showing an embodiment in which the input prism 20 and the optical path length compensating prism 17 are integrated into one body. In this embodiment, the optical path compensating prism 17 is made to adhere onto an end surface 20e of the input prism 20 from which the reflecting light of the projecting portion of the fingerprint is emergent.

Figure 15:
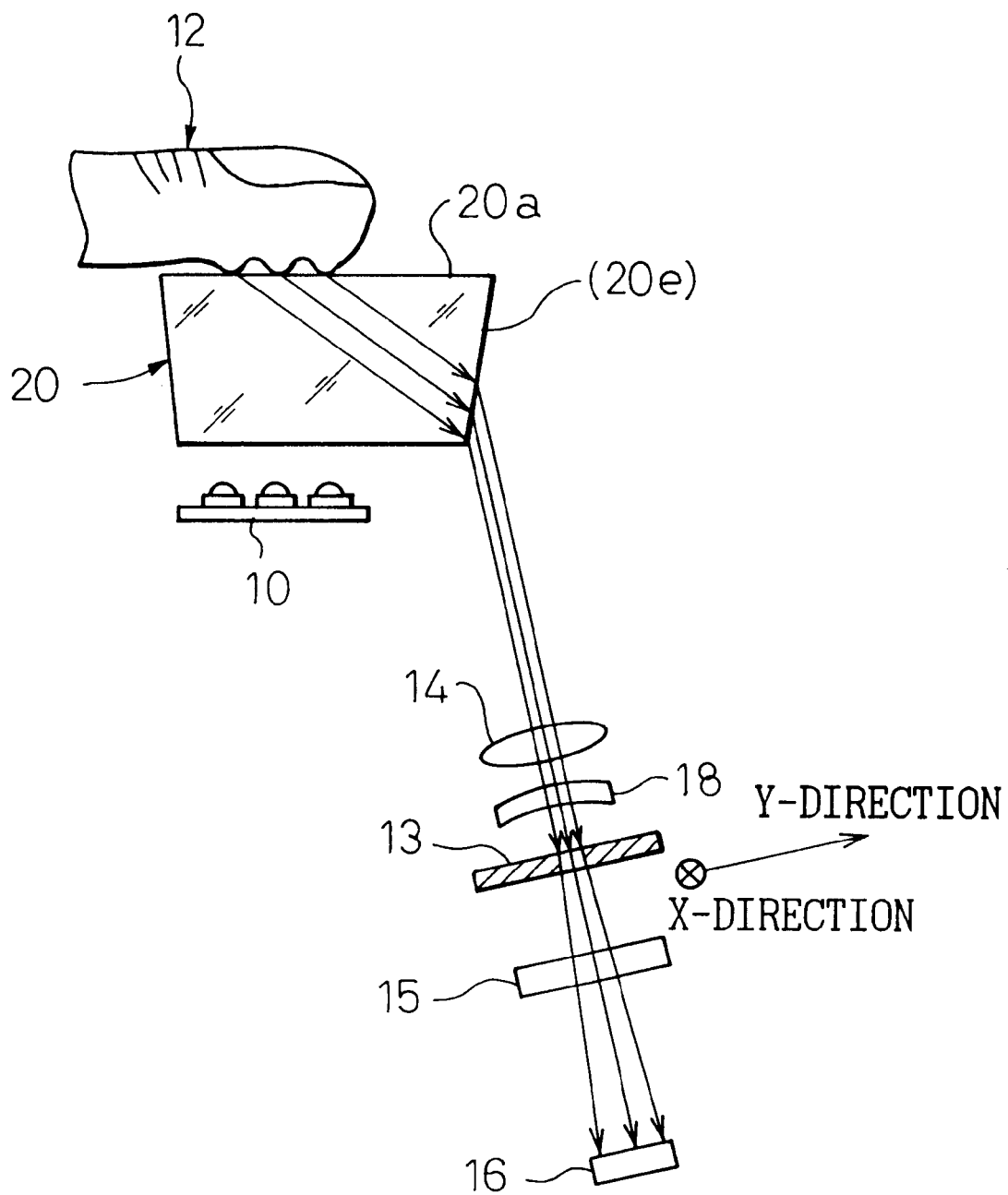
FIG. 15 is a view showing a variation in which the end surface of the input prism is oblique to the optical axis in the seventh embodiment.

In same manner as that of the parallel flat plate in the embodiment described before, even if the input prism 20 and the optical path length compensating prism 17 are not integrated into one body, the same effect as that of the arrangement in which the input prism 20 is integrated with the optical path compensating prism 17 can be provided when an angle of the surface 20e, from which reflecting light is introduced from the projecting fingerprint portion in the input prism 20, is not perpendicular to the optical axis but some angle is provided on the surface 20e as shown in FIG. 15.

EIGHTH EMBODIMENT

In the above embodiment, the refractive index of the transparent base 11 and that of the optical path length compensating prism 17 are the same, and the refractive index of the input prism 20 and that of the optical path length compensating prism 17 are the same. However, when these refractive indexes are different from each other, the following arrangement is adopted.

Figure 16:
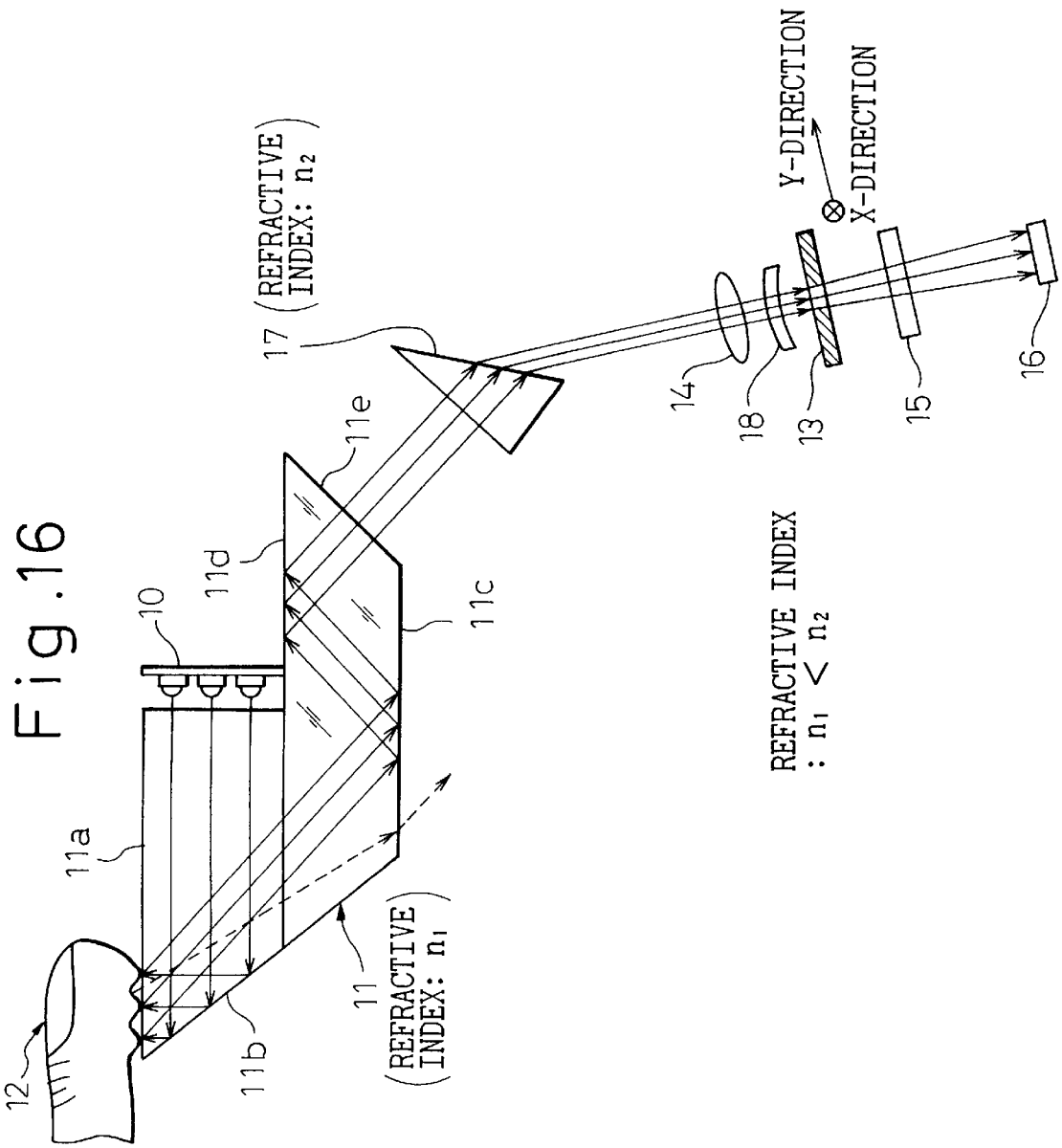
FIG. 16 is a view showing the eighth embodiment of the uneven-surface data detection apparatus of the present invention.

FIG. 16 is a view showing an example in which the refractive index $n_2$ of material of the compensating prism 17 is larger than the refractive index nl of material of the transparent flat plate 11 and the input prism 20 ($n_2 > n_1$). A difference in the refractive index between the compensating prism 17 and air is larger than a difference in the refractive index between the transparent flat plate 11 and air or between the input prism 20 and air. Therefore, the optical path length can be compensated for more easily.

That is, in the embodiment shown in FIG. 16 in which the arrangement of the optical system is the same as that of the embodiment shown in FIG. 10, a difference "c" in the optical path length compensated for by the compensating prism 17 can be expressed by the following equation in accordance with the equation (1) described before.

$$c = b - a/n_2 \tag{2}$$

On the other hand, with respect to a difference α in the optical path length on the input surface 11a, 20a of the transparent flat plate 11 or the input prism 20, compensation may be conducted so that the equation $\alpha/n_1 = c$ can be satisfied. Therefore, the following equation is established.

$$c = \alpha/n_1 = b - a/n_2 \quad (n_2 > n_1) \tag{3}$$

On the other hand, when there is no difference in the refractive index between the transparent flat plate 11 and the compensating prism 17 or between the input prism 20 and the compensating prism 17 in the same manner as that of the above embodiment, the following equation is established.

$$c = a/n_1 = b - a/n_2(n_2 - n_1) \quad (4)$$

Therefore, in the embodiment shown in FIG. 16, a compensation value of the compensating prism 17 can be made higher. Accordingly, the value "a" can be made relatively smaller than the value "b" in FIG. 6. Therefore, a difference between the angle β and the angle γ can be reduced in the compensating prism 17. As a result, it becomes easy to select the compensating prism 17. When the difference between the angle β and the angle γ is the same, the compensating value of the compensating prism 17 can be relatively increased.

NINTH EMBODIMENT

Figure 17:
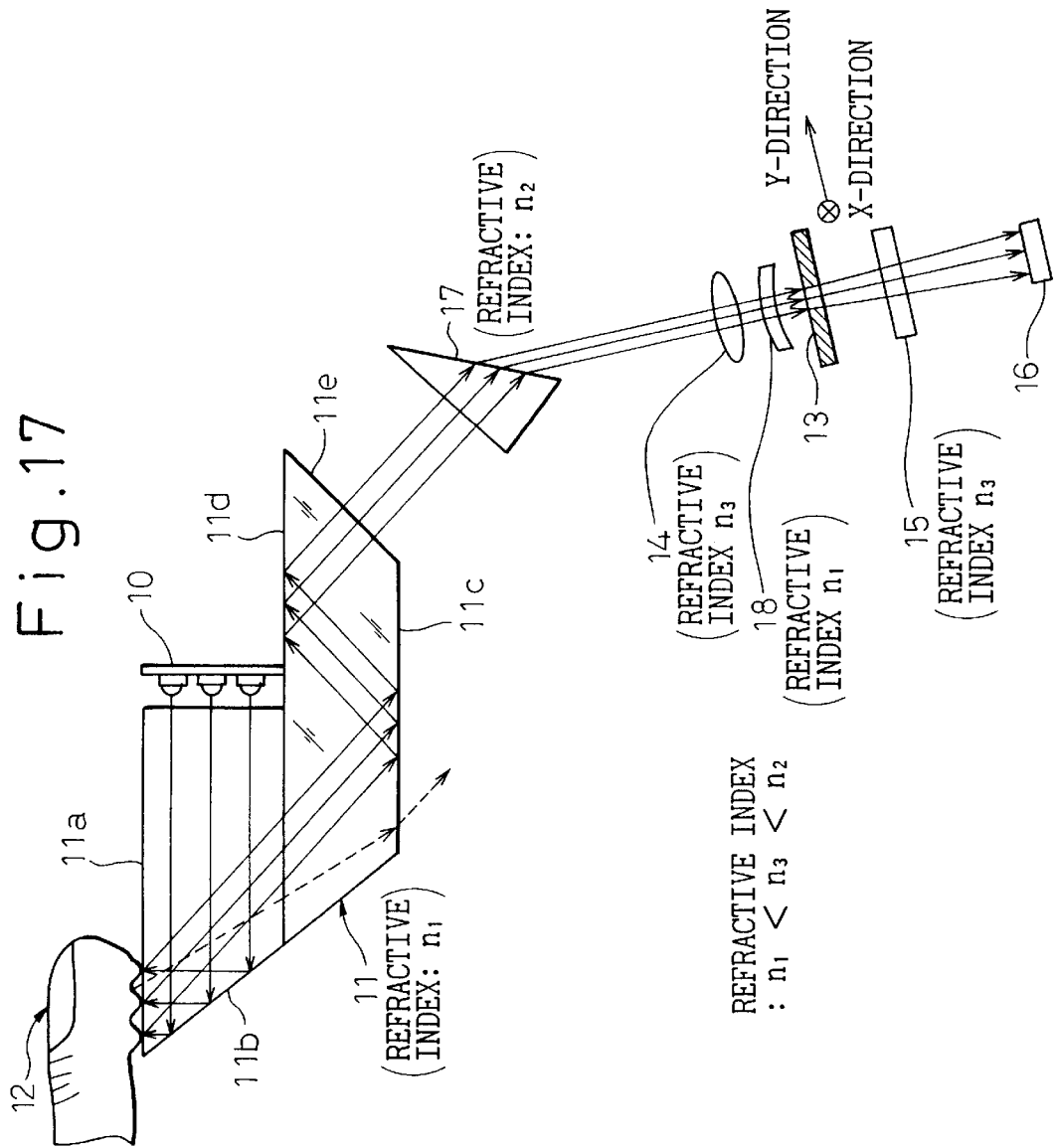
FIG. 17 is a view showing the ninth embodiment of the uneven-surface data detection apparatus of the present invention.
Figure 18:
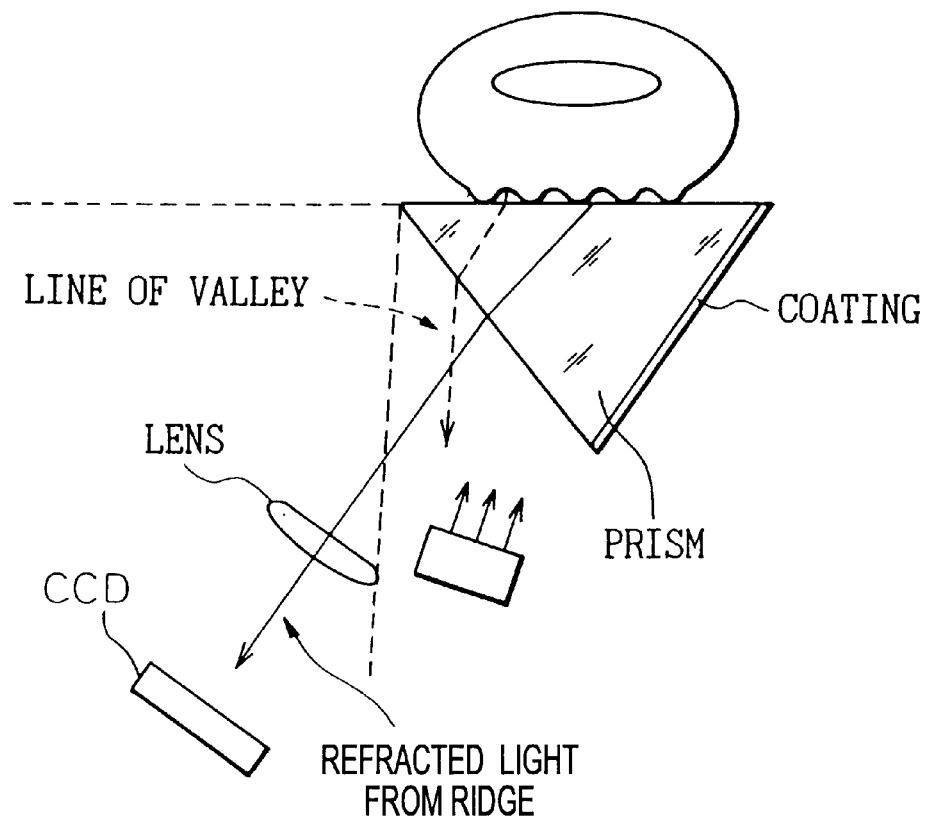
FIG. 18 is a view showing a fingerprint pickup optical system in which a prism is used.
Figure 19:
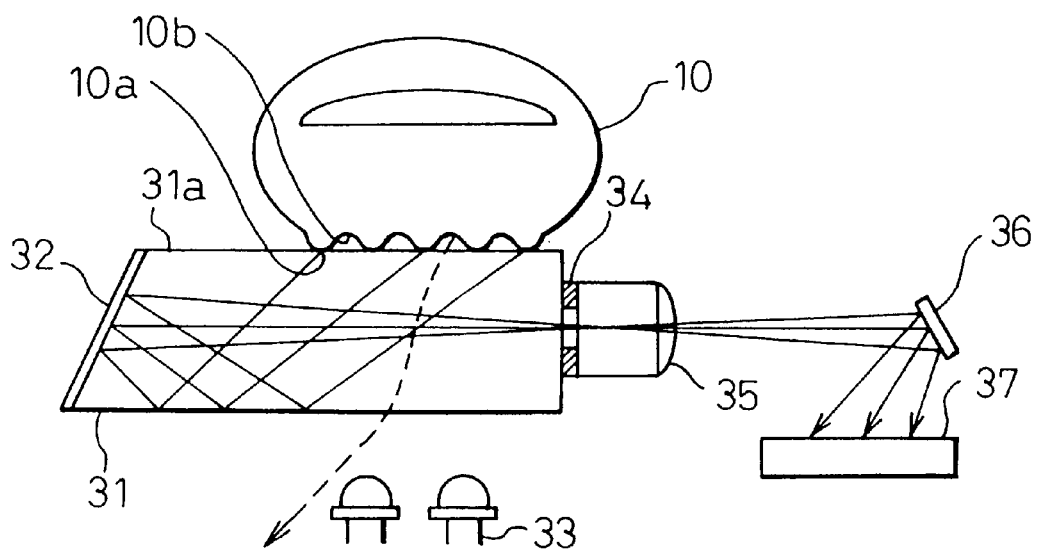
FIG. 19 is a view showing a fingerprint pickup optical system in which a parallel flat plate is used.
Figure 20:
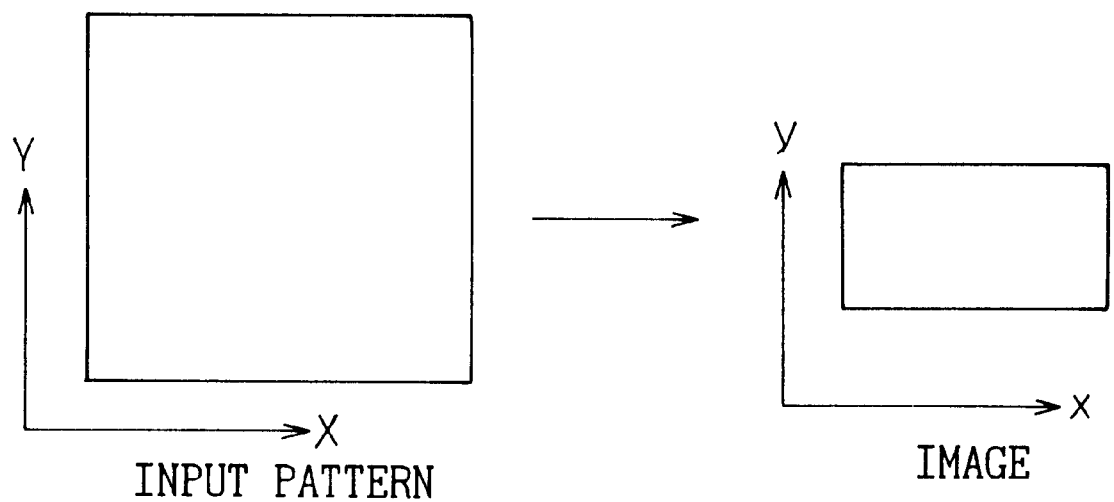
FIG. 20 is a view showing a state of image formation in the conventional optical system.

FIG. 17 is a view showing the ninth embodiment of the present invention. In this embodiment, the refractive index $n_1$ of material of the meniscus lens 18 can be made lower than the refractive index $n_3$ of material of the cylindrical lenses 14, 15 ($n_1 < n_3$). Therefore, it is possible to make the radiuses of curvature of the cylindrical lenses 14, 15 to be gentler. As a result, it possible to realize a higher optical resolving power (MTF).

Further, when the refractive index $n_2$ of the optical path length compensating prism 17 is made higher than the refractive index $n_3$ of material of the cylindrical lenses 14, 15 ($n_3 < n_2$), the optical path length can be easily compensated for. That is, as described before, when the value $n_2$ is made relatively high, the compensating prism 17 can be easily selected, and the compensating value of the compensating prism 17 can be made relatively high.

Embodiments of the present invention are explained above in detail, referring to the accompanying drawings. However, it should be noted that the present invention is not limited to the above specific embodiments, but variations may be made by one skilled in the art without departing from the spirit and scope of the invention.

(1) According to the uneven-surface data detection apparatus of the present invention, there is no trapezoidal distortion on a fingerprint image picked up by the apparatus, and it is possible to pick up a fingerprint image, the longitudinal magnification and the lateral magnification of which are the same.

(2) Since no distortion is caused on the fingerprint image that has been picked up by the optical system of the present invention, it is possible to use a CCD, the number of pixels of which is small as compared with the optical system in which distortion is caused. Therefore, the equipment cost can be reduced.

(3) It is unnecessary to remove a trapezoidal distortion from an image by means of image processing and it is also unnecessary to convert the resolution after a fingerprint image has been picked up for a criminal investigation. Accordingly, the image quality is not deteriorated.

(4) It is unnecessary to remove a trapezoidal distortion from an image by means of image processing and it is also unnecessary to convert the resolution after a fingerprint image has been picked up for a criminal investigation. Accordingly, there is no possibility of occurrence of erroneous characteristics.

What is claimed is:

1. An uneven-surface data detection apparatus comprising:

a non-hologram generating light source;

a transparent base in which light from the light source can be transmitted, having an uneven pattern input surface with which an uneven-surface to be detected comes into contact, also having a function in which light reflected on a projection coming into contact with the input surface and light reflected on a recess are separated from each other utilizing a critical angle on the interface with air when the uneven-surface is irradiated with light on the input surface;

an optical path length compensating prism on which light emergent from the transparent base is incident, wherein said optical path length compensating prism compensates for a difference in optical path lengths of the light incident on said optical path length compensating prism radiating from different regions of the input surface;

an optical system to form an image by light emergent from the optical path length compensating prism, the optical system being arranged on the optical axis at the rear of the optical path length compensating prism, having a diaphragm and one set of cylindrical lenses which are arranged perpendicularly to each other in the X and Y-directions for compensating an X and Y-directional magnification; and an image sensor arranged at an image forming position so that optical data of the uneven-surface focused by the optical system can be recorded.

2. An uneven-surface data detection apparatus according to claim 1, wherein the diaphragm is arranged on the optical axis at the rear of the optical path length compensating prism, and one set of cylindrical lenses, which are arranged perpendicularly to each other in the X and Y-directions, are arranged at the rear of the diaphragm.

3. An uneven-surface data detection apparatus according to claim 2, wherein the optical system further includes a meniscus lens arranged on the optical axis at the rear of the optical path length compensating prism and in the front of the diaphragm.

4. An uneven-surface data detection apparatus according to claim 1, wherein the diaphragm is arranged on the optical axis at the rear of the optical path length compensating prism, and one set of cylindrical lenses arranged at the rear of the diaphragm are composed of an incident surface side lens section which contributes to the image formation in the X-direction and an emergent side lens section which contributes to the image formation in the Y-direction, and these incident surface side lens section and emergent side lens section are arranged perpendicularly to each other in the X and Y-directions so as to compensate for the X and Y magnification.

5. An uneven-surface data detection apparatus according to claim 4, wherein the optical system further includes a meniscus lens arranged on the optical axis at the rear of the optical path length compensating prism and in the front of the diaphragm.

6. An uneven-surface data detection apparatus according to claim 5, wherein the refractive index of the cylindrical lens is higher than that of the meniscus lens.

7. An uneven-surface data detection apparatus according to claim 1, wherein the optical system includes:

a first cylindrical lens arranged on the optical axis at the rear of the optical path length compensating prism, the first cylindrical lens compensating for the X-magnification;

a meniscus lens arranged on the optical axis at the rear of the first cylindrical lens;

a diaphragm arrange d on the optical axis at the rear of the meniscus lens; and a second cylindrical lens arranged on the optical axis at the rear of the diaphragm, the second cylindrical lens compensating for the Y-magnification.

8. An uneven-surface data detection apparatus according to claim 7, wherein the refractive index of the first and second cylindrical lens is higher than that of the meniscus lens.

9. An uneven-surface data detection apparatus according to claim 1, wherein the transparent base is a parallel flat plate, and light from the light source incident on the parallel flat plate is irradiated on the uneven pattern input surface which is defined by one parallel surface of the parallel flat plate.

10. An uneven-surface data detection apparatus according to claim 1, wherein the transparent base is a prism having an uneven pattern input surface, and light from the light source incident on the prism is irradiated the uneven pattern input surface.

11. An uneven-surface data detection apparatus according to claim 1, wherein the refractive index of the optical path length compensating prism is higher than that of the transparent base.

* * * * *